C. D. ROBERTS.
NUT LOCK.
APPLICATION FILED SEPT. 19, 1916.
1,240,781.
Patented Sept. 18, 1917.
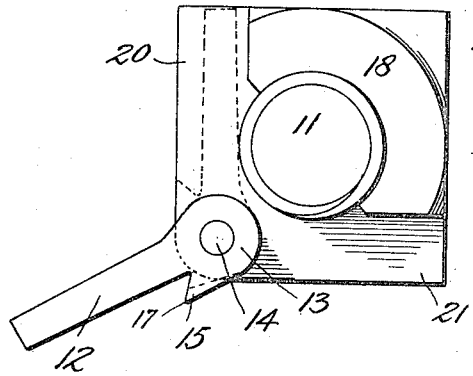
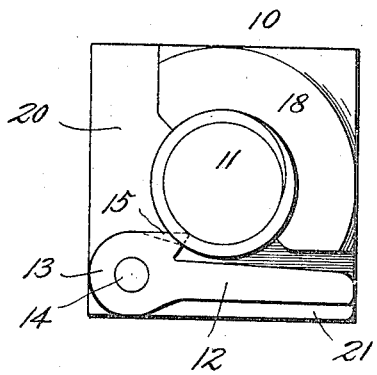
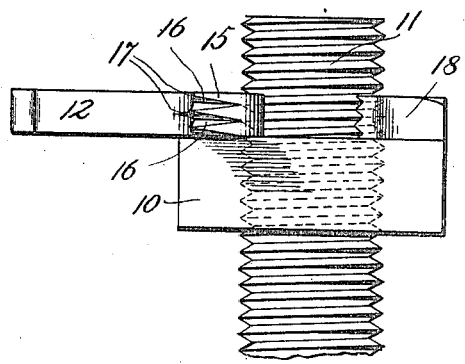
INVENTOR
Charles D. Roberts.
WITNESSES
BY
ATTORNEY

UNITED STATES PATENT OFFICE.

CHARLES D. ROBERTS, OF MONROE, NORTH CAROLINA.

NUT-LOCK.

1,240,781. Specification of Letters Patent. Patented Sept. 18, 1917.

Application filed September 19, 1916. Serial No. 121,052.

*To all whom it may concern:*

Be it known that I, CHARLES D. ROBERTS, a citizen of the United States, residing at Monroe, in the county of Union and State of North Carolina, have invented certain new and useful Improvements in Nut-Locks, of which the following is a specification.

This invention relates to nut locks, and has for its object to provide means carried by a nut which may be easily and quickly engaged with and disengaged from the threads on the exterior of a bolt, rod, or other article for preventing backward rotation of said nut after the latter has been screwed on the bolt as tightly as possible, and to this end the invention consists of an arm pivoted to one face of a nut having a spur projecting from one side which may be turned away from the threaded opening in the nut when the latter is to be screwed on a bolt and after the nut has been screwed up as tightly as possible, said arm is turned on its pivot to engage the spur with the thread of the bolt, and thus lock the nut against reverse rotation.

In the drawings,

Figure 1 is a plan view of the nut with the locking means turned to one side so as to enable the nut to be screwed readily upon or removed from the bolt, Fig. 2 is a similar view showing the locking means in position to prevent relative movement between the nut and the bolt, and Fig. 3 is an elevation of the nut on the end of a bolt with the locking means in position shown in Fig. 1.

In the drawings, 10 indicates a nut and 11 the threaded end of a bolt, rod, bar or other article. Pivotally mounted upon one face of the nut 10 and at one corner thereof is an arm or lever 12 having an enlarged head 13 on its inner end to receive the pivot 14 of said arm and a spur 15 projecting from one side of the arm, in the outer vertical face of which spur are cut angular grooves 16 that correspond in pitch to the threads of the bolt 10. These grooves form a series of sharp points 17 at the tip of the spur 15 that engage the threads on the bolt 10 when the arm is moved in the position shown in Fig. 2 and because of the knife-like irregular edge of the tip of the spur as shown in Fig. 3 bite into the threads of the bolt and lock the nut and bolt against relative rotation.

The nut 10 may have parallel upper and lower faces similar to the nuts now in use, or, as shown, there may be formed on the upper face of the nut on which the arm 12 is pivoted, an enlargement 18 that extends longitudinally on two adjacent sides of the nut nearly to the ends of said sides, leaving spaces 20 and 21 for the arm 12 when the latter is turned into its extreme open position and in its locked position.

In using this lock nut, the arm 12 may be swung outwardly as shown in full lines in Fig. 1, and the nut screwed on the bolt, the arm remaining in this position so long as the nut is readily turned by hand, but when a wrench is to be used, it is advisable to swing said arm into the dotted line position of Fig. 1 in order that the wrench may grip the nut without being interfered with by the arm. As soon as the nut has been tightened, the arm 12 is given a quarter turn about its pivot 14 and the spur 15 caused to bite into the threads of the bolt 10, thereby forming a lock between the bolt and the nut.

What is claimed is:

A nut lock comprising a nut proper, one face being cut away at two adjacent sides and one corner to provide a depressed portion in the plane of the face of said nut, an arm pivotally mounted on the depressed portion of said nut at the corner thereof, a spur projecting from one side of said arm and having a series of parallel angular grooves formed therein to produce pointed teeth that when said arm is swung into position over one of said depressed sides will engage the threads of a screw but when swung over the other depressed side will remove said spur from the threads and permit rotation of the nut, said arm in either of its swinging positions being wholly within the plane of the sides of the nut.

In testimony whereof I affix my signature in presence of two witnesses.

CHARLES D. ROBERTS.

Witnesses:
T. OLIN MCMANUS,
H. B. CLARK.

Copies of this patent may be obtained for five cents each, by addressing the "Commissioner of Patents, Washington, D. C."